US012583265B2

(12) United States Patent
Morita et al.

(10) Patent No.: US 12,583,265 B2
(45) Date of Patent: Mar. 24, 2026

(54) PNEUMATIC TIRE

(71) Applicant: Sumitomo Rubber Industries, Ltd.,
Hyogo (JP)

(72) Inventors: Shumpei Morita, Hyogo (JP); **Masumi
Suzuki, Hyogo (JP); Takashi Miki**,
Hyogo (JP); Noboru Okabe, Hyogo
(JP)

(73) Assignee: **SUMITOMO RUBBER
INDUSTRIES, LTD.**, Hyogo (JP)

( * ) Notice: Subject to any disclaimer, the term of this
patent is extended or adjusted under 35
U.S.C. 154(b) by 51 days.

(21) Appl. No.: 18/265,034

(22) PCT Filed: Nov. 17, 2021

(86) PCT No.: PCT/JP2021/042237
§ 371 (c)(1),
(2) Date: Jun. 2, 2023

(87) PCT Pub. No.: WO2022/130885
PCT Pub. Date: Jun. 23, 2022

(65) Prior Publication Data
US 2024/0017575 A1 Jan. 18, 2024

(30) Foreign Application Priority Data

Dec. 15, 2020 (JP) ................................. 2020-207839

(51) Int. Cl.
*B60C 19/08* (2006.01)
(52) U.S. Cl.
CPC .................................. *B60C 19/082* (2013.01)

(58) Field of Classification Search
CPC ..... B60C 19/082; B60C 19/08; B60C 19/084;
B60C 9/005; D02G 3/48
See application file for complete search history.

(56) References Cited

U.S. PATENT DOCUMENTS

| 10,145,036 B1 * | 12/2018 | Sunshine | ............... D02G 3/441 |
| 2014/0173900 A1 | 6/2014 | Tanaka | |
| 2015/0328941 A1 | 11/2015 | Hirosue | |

(Continued)

FOREIGN PATENT DOCUMENTS

| EP | 2735455 A1 | 5/2014 |
| EP | 3088215 A1 | 11/2016 |

(Continued)

OTHER PUBLICATIONS

Hata, English Machine Translation of JP 2016078742, 2016 (Year: 2016).*

(Continued)

*Primary Examiner* — Katelyn W Smith
*Assistant Examiner* — Brendon Charles Darby
(74) *Attorney, Agent, or Firm* — Greenblum & Bernstein, P.L.C.

(57) ABSTRACT

A pneumatic tire has a carcass. The carcass includes a carcass ply extending from one bead portion to the other bead portion through a tread portion. The carcass ply is provided with at least one conductive thread extending from one bead portion to at least the tread portion. The conductive thread has an electrical resistance of $10^8$ $\Omega$/cm or less per unit length. The conductive thread has a stress of 13 N or less at 1% elongation.

17 Claims, 6 Drawing Sheets

(56)  References Cited

U.S. PATENT DOCUMENTS

| | | | |
|---|---|---|---|
| 2017/0259626 A1 | 9/2017 | Hata et al. | |
| 2019/0023083 A1* | 1/2019 | Yanagioka | C08L 17/00 |
| 2019/0193465 A1* | 6/2019 | Lee | C08L 7/00 |
| 2019/0344629 A1* | 11/2019 | Verstraeten | D02G 3/36 |
| 2020/0122510 A1 | 4/2020 | Hata et al. | |

FOREIGN PATENT DOCUMENTS

| | | | | |
|---|---|---|---|---|
| EP | 3403854 A1 | | 11/2018 | |
| JP | H03-169711 A | | 7/1991 | |
| JP | 2004-130859 A | | 4/2004 | |
| JP | 2013-082403 A | | 5/2013 | |
| JP | 2014-133467 A | | 7/2014 | |
| JP | 2015-123900 A | | 7/2015 | |
| JP | 2015120446 A | * | 7/2015 | |
| JP | 2016078742 A | * | 5/2016 | |
| JP | 2017-043122 A | | 3/2017 | |
| JP | 2017-124730 A | | 7/2017 | |
| JP | 2019-188949 A | | 10/2019 | |

OTHER PUBLICATIONS

Ishii, English Machine Translation of JP 2015120446, 2015 (Year: 2015).*
International Search Report issued in WIPO Patent Application No. PCT/JP2021/042237, dated Dec. 28, 2021, along with an English translation thereof.
European Supplementary Search Report in related European application No. 21906249, dated May 8, 2024.

* cited by examiner

PNEUMATIC TIRE

FIELD OF THE INVENTION

The present disclosure relates to a pneumatic tire.

BACKGROUND OF THE INVENTION

In general, when the electrical resistance of a pneumatic tire increases, static electricity accumulates in a vehicle, which may cause radio interference such as radio noise. Particularly in recent years, the demand for lower fuel consumption has led to an increase in electrical resistance of tread rubber and other materials.

In order to reduce the electrical resistance of tires, the following Patent Literature 1 proposes a pneumatic tire in which composite fibers containing conductive fibers and non-conductive fibers are arranged on the surface of the carcass, for example. In the Patent Literature 1, the afore-mentioned composite fibers are expected to reduce the electrical resistance of the tires without adversely affecting the tire manufacturing process.

[Patent Literature 1] Japanese Unexamined Patent Appli-cation Publication No. 2017-124730

SUMMARY OF THE INVENTION

Problems to be Solved by the Invention

The composite fibers described above may be broken due to repeated deformation when the tire is running or due to local deformation of the tread portion and/or sidewall por-tions when the tire runs over bumps on a road surface. In particular, there is a concern that the composite fibers may break when localized and large deformation is applied between the vehicle and the curb, especially when the vehicle runs over a curb in a parking lot. If the composite fibers are broken, static electricity of the vehicle may not be effectively released to the ground. In addition, the above-mentioned composite fibers are generally made of metal as conductive fibers, and because of their high modulus, they inhibit sidewall deflection during rolling, which may dete-riorate the ride quality.

The present disclosure was made in view of the above, and a primary object thereof is to provide a pneumatic tire which suppresses breakage of conductive thread as described above, has low electrical resistance and excellent ride comfort even after the tire is locally subjected to large deformation.

Means for Solving the Problem

The present disclosure is a pneumatic tire including a carcass, wherein the carcass includes a carcass ply extending from one bead portion to the other bead portion through a tread portion, the carcass ply is provided with at least one conductive thread extending from the one bead portion to at least the tread portion, the conductive thread has an electri-cal resistance of $10^8$ $\Omega$/cm or less per unit length, and the conductive thread has a stress of 13 N or less at 1% elongation.

Advantageous Effects of the Invention

By adopting the above configuration, it is possible that the pneumatic tire of the present disclosure suppresses breakage of the conductive thread, and has low electrical resistance and can exert excellent ride comfort even after a large local deformation is applied to the tire.

DESCRIPTION OF THE REFERENCE SIGNS

6 carcass
4 bead portion
6A carcass ply
9 conductive thread

DETAILED DESCRIPTION OF THE INVENTION

An embodiment of the present disclosure will now be described below in conjunction with accompanying draw-ings.

Figure 1:
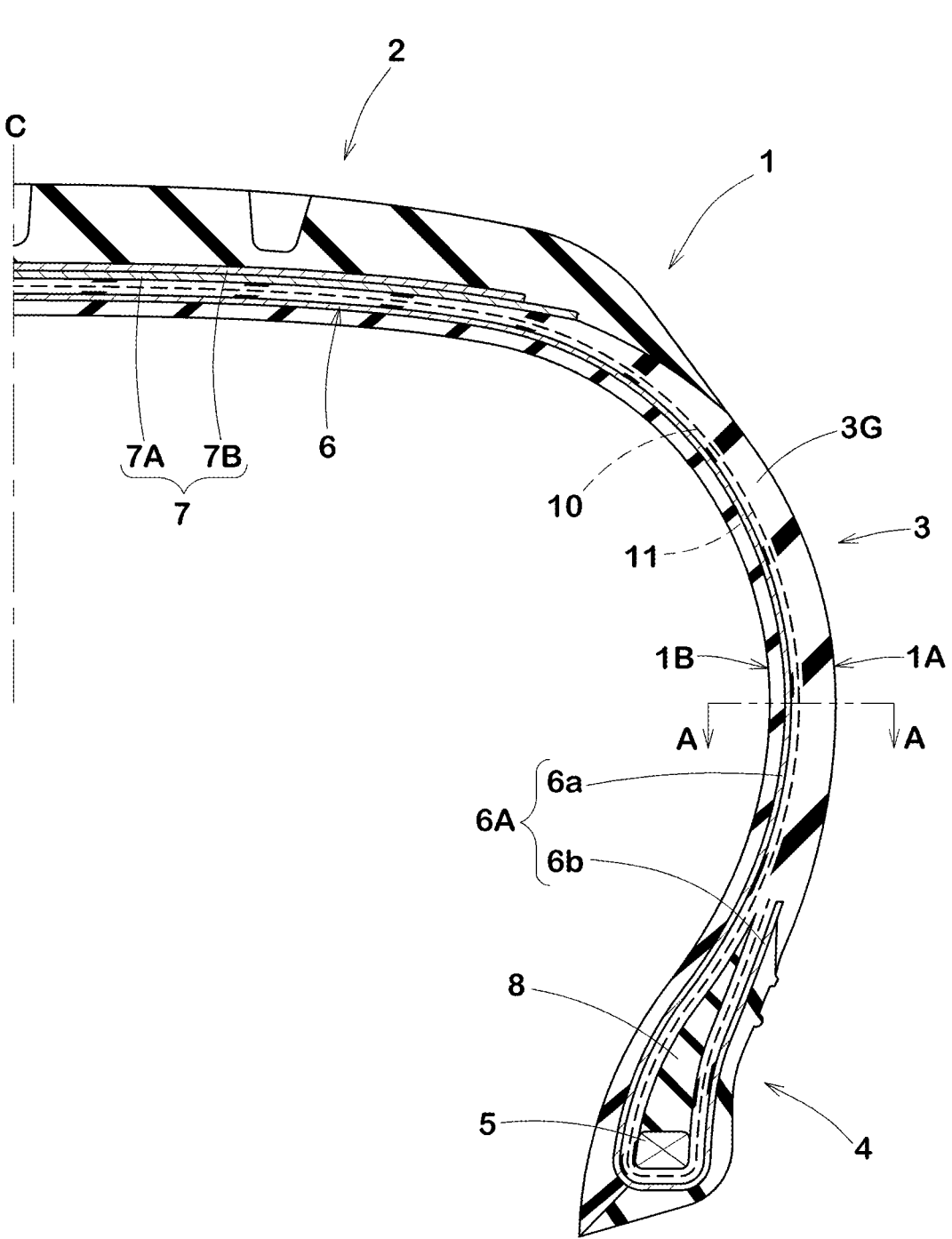
FIG. 1 is a cross-sectional view showing a pneumatic tire according to an embodiment of the present disclosure.

FIG. 1 is a tire meridian section passing all through a tire rotational axis of a pneumatic tire 1 (hereinafter may be simply referred to as "tire") in a standard state. It should be noted that FIG. 1 is a diagram showing a half of the tire cross section on one side in a tire axial direction from a tire equator (C) when the tire 1 extending in an annular shape is cut along a virtual plane orthogonal to a tire circumferential direction. The tire 1 of the present embodiment is suitable for passenger cars, for example.

In the case of pneumatic tires for which various standards have been established, the "standard state" refers to a state in which the tire is mounted on a standard rim, inflated to a standard inner pressure, and loaded with no tire load. In the case of pneumatic tires for which various standards have not been established, the above-mentioned standard state means a standard use state of the tire being loaded with no load according to the purpose of use. In the present specification, unless otherwise specified, the dimensions and the like of various parts of the tire are values measured in the standard state. When measuring the physical properties of inner components of a tire as a product according to the present specification, the inner components shall be sampled in a manner that does not impair their characteristics, and then the physical properties shall be measured.

The "standard rim" refers to a wheel rim specified for the concerned tire by a standard included in a standardization system on which the tire is based, for example, the "normal wheel rim" in JATMA, "Design Rim" in TRA, and "Mea-suring Rim" in ETRTO. If no standard is specified for the rim, the rim with the smallest rim diameter followed by the narrowest rim width among the rims on which the tire can be mounted and can hold internal pressure may be employed as the standard rim, for example.

The "standard inner pressure" refers to air pressure speci-fied for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO. If the inner pressure is not specified, a general inner pressure according to the intended use of the tire may be employed, for example, 250 kPa for passenger cars.

As shown in FIG. 1, the pneumatic tire 1 has a carcass 6. The carcass 6 includes a carcass ply 6A having carcass cords extending from one bead portion 4 to another bead portion (not shown) through a tread portion 2. It is needless to say that the carcass ply 6A passes through sidewall portions 3 each arranged between the tread portion 2 and a respective one of the bead portions 4.

The carcass ply 6A of the present embodiment consists of parallel carcass cords coated with a topping rubber, for example. The carcass 6 of the present embodiment is formed by a single carcass ply 6A, but may be formed by a plurality of the carcass ply 6A.

The carcass ply 6A includes a main body portion (6a) and turned-up portions (6b), for example. The main body portion (6a) extends between the two bead portions 4, for example. Therefore, the main body portion (6a) extends at least from the tread portion 2 through the sidewall portions 3 to bead cores 5 of the bead portions 4. The turned-up portions (6b) are connected to the main body portion (6a) and each turned up around a respective one of the bead cores 5 from inside to outside in the tire axial direction, for example. Bead apex rubbers 8 each extending outward in a tire radial direction from a respective one of the bead cores 5 is arranged between the main body portion (6a) and a respective one of the turned-up portions (6b) to reinforce the bead portions 4 accordingly.

Organic fiber cords such as aramid and rayon are used as the carcass cords, for example. It is preferred that the carcass cords are arranged at an angle from 70 to 90 degrees with respect to the tire equator (C), for example.

As a preferred embodiment, a belt layer 7 is provided radially outside the carcass 6 in the present embodiment. The belt layer 7 is formed by two belt plies 7A and 7B stacked in the tire radial direction, for example. The belt plies 7A and 7B each consists of belt cords coated with a topping rubber and are stacked inside and outside in the tire radial direction so that the belt cords intersect each other.

Figure 2:
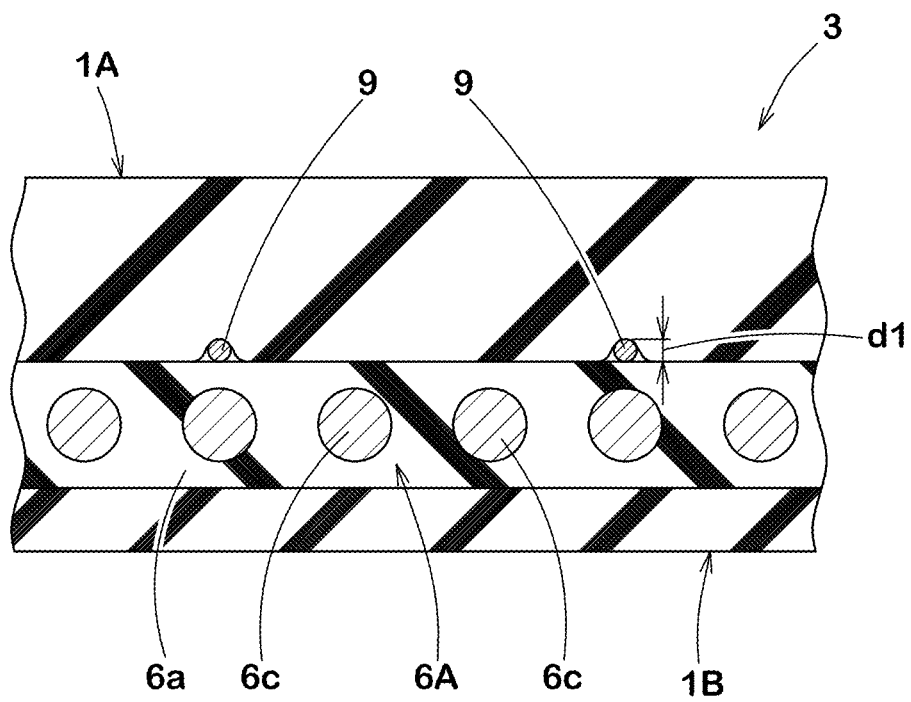
FIG. 2 is a cross-sectional view taken along A-A line of FIG. 1.

FIG. 2 shows a cross-sectional view taken along A-A line of FIG. 1. As shown in FIG. 2, the tire 1 of the present disclosure has at least one conductive thread 9 arranged on the carcass ply 6A and extending from one of the bead portions 4 to at least the tread portion 2. It should be noted that the conductive thread 9 is indicated by a dashed line in FIG. 1.

The conductive thread 9 has an electrical resistance of $10^8$ $\Omega$/cm or less per unit length. A tire provided with the conductive thread 9 configured as such has a small electrical resistance, and can suppress the accumulation of static electricity in the vehicle.

Figure 3:
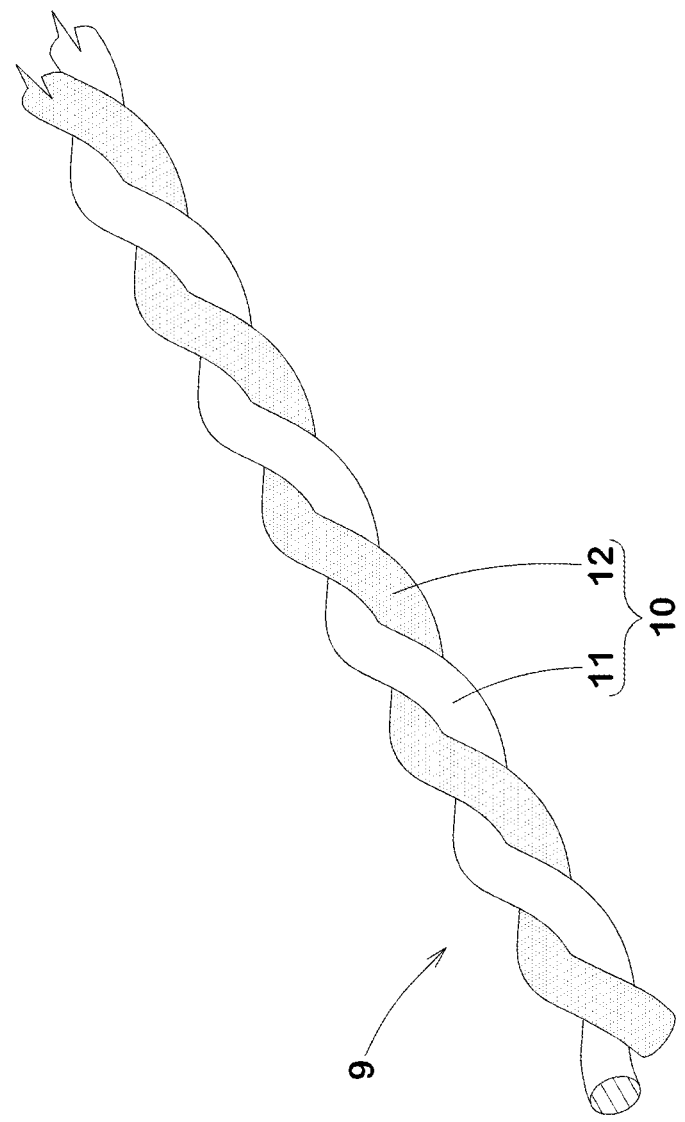
FIG. 3 is an enlarged perspective view of a conductive thread.

FIG. 3 shows an enlarged view of the conductive thread 9. As shown in FIG. 3, the conductive thread 9 of the present embodiment is a composite thread 10 containing a conductive fiber 11 and a non-conductive fiber 12, for example. However, the conductive thread 9 of the present disclosure is not limited to the composite thread 10 configured as such. Thereby, in another embodiment, the conductive thread 9 may consist only of the conductive fiber 11, for example. It should be noted that in each of the drawings other than FIGS. 3 and 5 of the present specification, the composite thread 10 is shown as a single thread material, and the distinction between the conductive fiber 11 and the non-conductive fiber 12 is not shown.

In the present disclosure, the conductive thread 9 has a stress of 13 N or less at 1% elongation. The stress at 1% elongation means the stress acting on the conductive thread 9 when the straightened conductive thread 9 is elongated by 10%. It should be noted that the straightened shape refers to the state in which the conductive thread 9 is arranged in the vertical direction and stretched by its own weight or a slight force. As a measuring method, a tensile testing machine is used to measure the stress at 1% elongation of the conductive thread 9 of a predetermined length (excluding the gripping allowance of the testing machine, e.g., from 300 to 800 mm), depending on the length of the conductive thread 9 employed in the tire. It should be noted that the stress in the present disclosure refers to the force generated when the conductive thread 9 is elongated by a predetermined amount of deformation. Further, when the conductive thread 9 is collected from the molded tire, it is desirable that the conductive thread 9 is collected in a manner that does not change the physical properties of the conductive thread 9 as much as possible. For this reason, in the above case, it is desirable to measure the aforementioned stresses of the conductive thread 9 after the rubber member of the tire adhering to the conductive thread 9 has been removed as much as possible without plastically deforming the conductive thread 9.

By adopting the above configuration, the pneumatic tire of the present disclosure suppresses the breakage of the conductive thread 9, has low electrical resistance and excellent ride quality even after a large local deformation is applied to the tire. The following mechanisms can be inferred as reasons for this.

The developers investigated the elongation of the conductive thread 9 during running on tires provided with the conductive thread 9. As a result, it was found that the conductive thread 9 during running of the tire are elongated by about from 0.5% to 3.0% over the entire length thereof regardless of the running conditions and the arrangement of the conductive thread 9 (whether straight or wavy). It is presumed that the above elongation occurs over the entire conductive thread 9 due to the stress from a rubber member in close contact with the conductive thread 9. Moreover, from these results, it was found that the breakage of the conductive thread can be significantly suppressed and the ride comfort can be improved by regulating the stress at 1% elongation of the conductive thread 9.

Since the stress at 1% elongation of the conductive thread 9 of the present disclosure is set as small as 13 N or less, it can be moderately extended for repeated deformation of the tire during running and local deformation of the tread portion 2 and/or the sidewall portions 3 when the tire 1 runs over bumps on road surfaces, therefore, the conductive thread 9 is less likely to break. The above-mentioned conductive thread 9 can also suppress damage to the surrounding rubber member even when the tire is deformed. Further, the conductive thread 9 of the present disclosure does not inhibit the deflection of the sidewall portions 3 and can be expected to improve ride comfort. It is presumed that such functions and effects as described above suppress the breakage of the conductive thread 9, therefore, an increase in electrical resistance of the tire is prevented, thereby, excellent ride comfort can be exerted. It should be noted that the present disclosure specifies the conductive thread 9 itself as described above, and it is needless to say that the present disclosure is different from specifying part of the materials included in the conductive thread 9.

It should be noted that the stress at 1% elongation described above can be adjusted by the material and composition ratio of the fibers constituting the conductive thread 9, the number of twists and thickness of the conductive thread 9. Specifically, the stress can be decreased by increasing the proportion of fibers with low elastic modulus such as nylon and polyester, by using short fibers instead of long fibers, by increasing the number of twists, and by reducing the wire diameter.

A more detailed configuration of the present embodiment will be described below. It should be noted that the configurations described below are specific forms of the present embodiment. Therefore, it goes without saying that the present disclosure can achieve the above-described effects even if it does not have all the specific configurations described below. Further, even if any one of the configurations described below is applied alone to the tire of the present disclosure, which has the features described above, an improvement in performance according to the applied configuration can be expected. Furthermore, when some of the configurations described below are applied in combination, a combined performance improvement can be expected according to the combination of the applied configurations.

As shown in FIG. 1, the conductive thread 9 in the present form extends from one bead portion 4 through the sidewall portions 3 and the tread portion 2 to the other bead portion (not shown), for example. The conductive thread 9 configured as such can reliably increase the conductivity and prevent a decrease in the conductivity even when the conductive thread is broken in one location.

It is preferred that the conductive thread 9 is arranged on an outer surface of the carcass ply 6A. The conductive thread 9 configured as such also helps to prevent air from being trapped between the carcass ply 6A and other rubber members during tire manufacturing. Hereafter, such a function or effect may be referred to as "air release property". It should be noted that the outer surface of the carcass ply 6A means outer surfaces of the topping rubber covering the carcass cords, and includes both outer surfaces on a tire outer surface 1A side and a tire inner cavity surface 1B side.

The arrangement of the conductive thread 9 is not limited to the above-described manner. The conductive thread 9 may be arranged to be sewn into or wrap around the carcass ply 6A, for example.

It is preferred that a plurality of the conductive threads 9 is arranged in the tire circumferential direction, for example. This reliably improves the conductivity of the tire 1. From the point of view of improving the conductivity and the air release property, the number of the conductive threads 9 in a side view of the tire is from 4 to 12, for example. However, it is not limited to such a mode.

As shown in FIG. 3, in the present specification, the term "fiber" as used in the conductive fiber 11 and the non-conductive fiber 12 of the composite thread 10 forming the conductive thread 9 can mean both a so-called filament having a relatively large length and a so-called staple having a relatively small length. Each of the conductive fiber 11 and the non-conductive fiber 12 of the present embodiment is composed of filaments. Specifically, each composite thread 10 is formed by upper-twisting the lower-twisted conductive fiber 11 and the lower-twisted non-conductive fiber 12, for example. However, it is not limited to such a mode, and each of the composite threads 10 of the present embodiment suffices as long as it includes the conductive fiber 11 and the non-conductive fiber 12 in any mode.

The conductive fiber 11 is a fiber having conductivity at least enough to prevent the generation of static electricity.

Specifically, the conductive fiber 11 preferably has an electrical resistance per unit length of $10^5$ Ω/cm or less, and more preferably said electrical resistance is $10^2$ Ω/cm or less. It should be noted that the electrical resistance of the conductive fiber 11 and the conductive thread 9 can be adjusted by changing the ratio and type of metal filament, etc., as described below.

The conductive fiber 11 includes metal filaments or carbon fibers, for example. Stainless steel, for example, is preferred as the metal filaments. The conductive fiber 11 of the present embodiment is formed by twisting metal filaments made of stainless steel. The conductive fiber 11 configured as such provides excellent corrosion resistance. In the present specification, stainless steel is defined by Japanese Industrial Standard JIS G 0203 and means an alloy steel containing 1.2% or less of carbon and 10.5% or more of chromium.

Ferritic stainless steel or austenitic stainless steel is preferred as the stainless steel, for example. These stainless steels can exert excellent corrosion resistance and ductility, and can effectively suppress the breakage of the conductive thread 9. It should be noted that ferritic stainless steel is a stainless steel whose main metal structure is ferrite at room temperature. Austenitic stainless steel is a stainless steel whose metal structure is austenite at room temperature.

In particular, since austenitic stainless steel is nonmagnetic, the metal filaments are not magnetized even after long-term use of the tire. Therefore, the occurrence of radio interference due to the rotation of the tire is reliably suppressed.

It is preferred that the non-conductive fiber 12 is made of a material having better adhesion to the rubber members of the tire than the conductive fiber 11. Further, it is preferred that the non-conductive fiber 12 has higher plasticity than the conductive fiber 11. The conductive thread 9 containing the non-conductive fibers 12 configured as such is easily adhered to the rubber members, therefore, it is possible that productivity of the tire and durability of the tire are improved. From this point of view, a plastic material or the like is used for the non-conductive fiber 12, for example. More specifically, the non-conductive fiber 12 of the present embodiment includes polyester or polyamide.

As a result of being formed of the materials described above, the non-conductive fiber 12 has a degree of conductivity that cannot be expected to prevent static electricity compared to conductive fiber 11. In the present disclosure, although the electrical resistance per unit length of the non-conductive fiber 12 is not particularly limited, the electrical resistance per unit length of the non-conductive fiber 12 is $10^8$ Ω/cm or more due to the above configuration, for example.

It is preferred that the conductive thread 9 has a stress of 25 N or less at 2% elongation. Thereby, the breakage of the conductive thread 9 is reliably suppressed.

It is preferred that the stress at 1% elongation of the conductive thread 9 is smaller than the stress at 1% elongation of the carcass cords (6c). Similarly, it is preferred that the stress at 2% elongation of the conductive thread 9 is smaller than the stress at 2% elongation of the carcass cords (6c). As a result, stress is not concentrated on the conductive thread 9 even when the tire is deformed, therefore, the breakage of the conductive thread 9 is effectively suppressed.

It should be noted that the stress at 2% elongation can be adjusted in the same way as the stress at 1% elongation. Specifically, it can be reduced by increasing the proportion of fibers with low elastic modulus such as nylon and polyester, by using short fibers instead of long fibers, by increasing the number of twists, and by decreasing the wire diameter.

The conductive thread 9 contains the non-conductive fiber 12 of 50% or more by weight, preferably from 70% to 90% by weight, for example. As a result, the adhesion between the rubber members of the tire and the conductive thread 9 is further improved, and the productivity and the durability of the tire are improved.

The diameter d1 of the conductive thread 9 is, for example, from 0.03 to 1.00 mm, preferably from 0.05 to 0.30 mm. The conductive thread 9 configured as such can increase the conductivity of the tire without impairing the appearance of the tire.

The conductive thread 9 of the present embodiment has a breaking strength (maximum stress at break) in the range from 5 to 50N, and preferably from 5 to 20N, for example.

Figure 4:
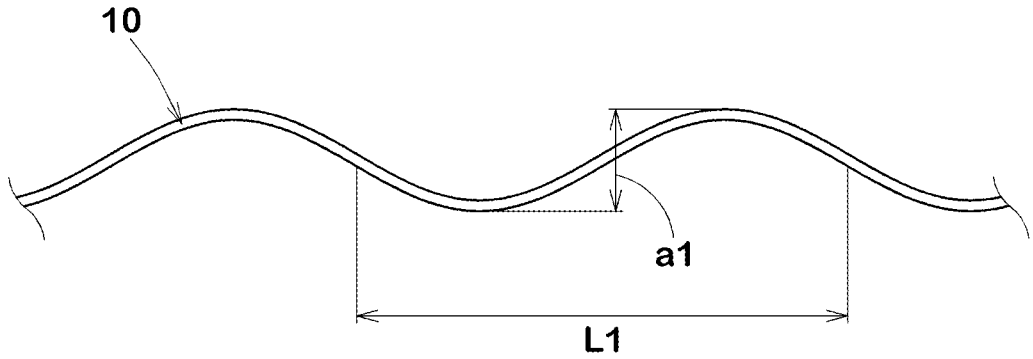
FIG. 4 is an enlarged view of the conductive thread extending in a wavy manner.

FIG. 4 shows an enlarged view of the conductive thread 9 extending in a wavy manner. As shown in FIG. 4, the conductive thread 9 of this embodiment can be set to have a large elongation at break. Therefore, the conductive thread 9 of this embodiment can be extended appropriately in response to the deformation of the tire, thereby, its breakage can be reliably suppressed.

The conductive thread 9 extends in a wavy manner with an amplitude (al) (peak-to-peak amplitude) of 2.0 mm or less, for example. It is preferred that the amplitude (al) is in the range from 0.5 to 1.5 mm, for example. As a result, the breakage of the conductive thread 9 is suppressed, and an increase in tire weight due to the conductive thread 9 is suppressed.

From a similar point of view, a wavelength L1 of the conductive thread 9 is 100 mm or less, for example. Specifically, it is preferred that the wavelength L1 is from 30 to 80 mm.

As shown in FIG. 1, the tread portion 2 and the sidewall portions 3 deform more than the bead portion 4 during running. Therefore, the conductive thread 9 tends to be stretched significantly in the tread portion 2 and the sidewall portions 3. From this point of view, it is preferred that the amplitude of the conductive thread 9 in the tread portion 2 is larger than the amplitude of the conductive thread 9 in the bead portions 4. Further, it is preferred that the amplitude of the conductive thread 9 in the sidewall portions 3 is greater than the amplitude of the conductive thread 9 in the bead portions 4. As a result, this effectively suppresses the breakage of the conductive thread 9 in portions where deformation is large, while suppressing the increase in the tire weight due to the conductive thread 9.

The wavy conductive thread 9 described above does not have its center of amplitude extending parallel to the radial direction, but preferably has its center of amplitude extending in a large wavy shape (about 0.5 to 1.5 cycles between the two bead portions) with an amplitude of about 50 to 150 mm in the tire circumferential direction as it extends from one bead portion 4 through the sidewall portions 3 and the tread portion 2 to the other bead portion, for example. In other words, the conductive thread 9 of the present embodiment forms a large wave shape between the two bead portions while extending in a wavy shape with the small amplitude (al). Thereby, breakage of the conductive thread 9 is further suppressed.

Figure 5:
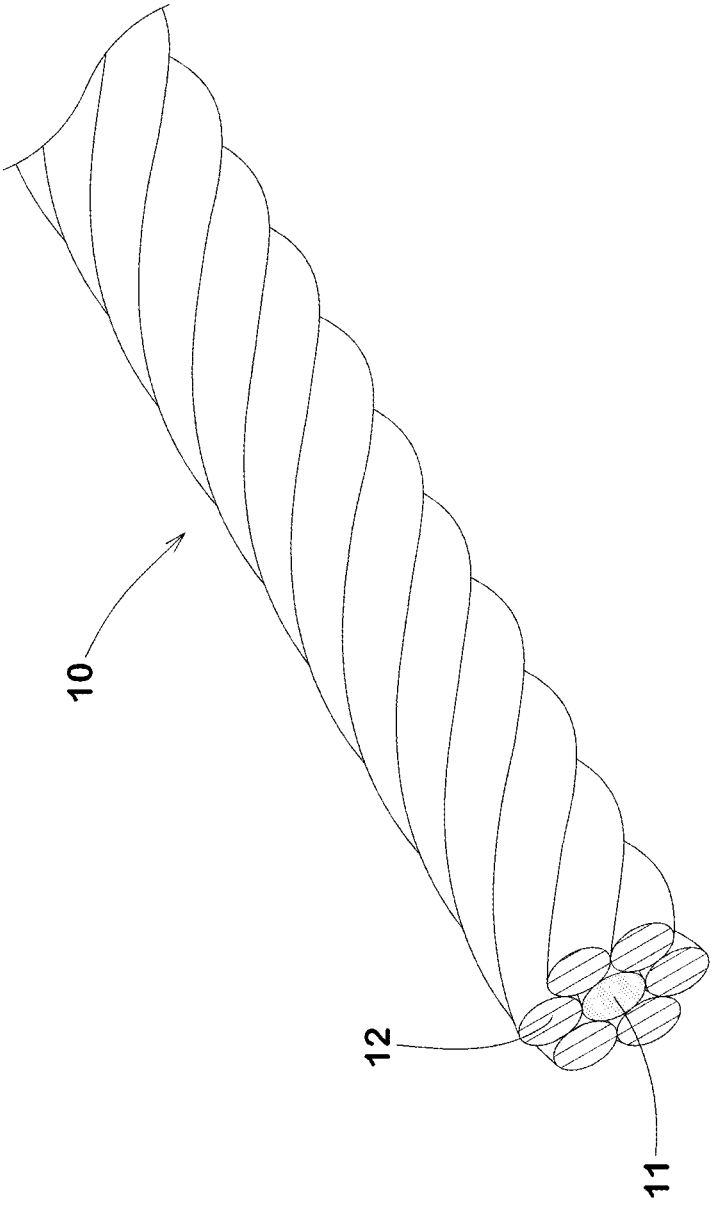
FIG. 5 is an enlarged perspective view of a composite thread according to another embodiment.

FIG. 5 shows an enlarged perspective view showing a cross section of the composite thread 10 applied as the conductive thread 9 of another embodiment. As shown in FIG. 5, the composite thread 10 of this embodiment has one conductive fiber 11 at the center and a plurality of the non-conductive fibers 12 twisted around it, for example. The composite thread 10 configured as such has excellent adhesion to rubber and helps to improve tire durability.

The conductive thread 9 of the present disclosure is not limited to the embodiments described above, and the composite thread 10 may include the conductive fibers 11 and the non-conductive fibers 12 each configured in the form of short fibers, for example.

As shown in FIG. 1, the developers found that it is important to specify a sidewall rubber 3G of the sidewall portions 3 in order to achieve a good balance between the suppression of the breakage of the conductive thread 9 and the improvement of the ride comfort. From this point of view, in the present embodiment, the sidewall rubber 3G of the sidewall portions 3 has a complex elastic modulus E* of preferably from 3.2 to 8.0 MPa, more preferably from 3.2 to 6.0 MPa. As a result, the sidewall portions 3 are moderately deformed and move in accordance with the conductive thread 9, thereby preventing stress from concentrating on the conductive thread 9 and thus suppressing breakage thereof. Further, the sidewall rubber configured as such also helps to improve the ride comfort. The aforementioned complex elastic modulus E* was measured in accordance with Japanese Industrial Standard JIS-K6394 under the following conditions by using a dynamic viscoelasticity measurement device (EPLEXOR series) manufactured by GABO QUALIMETER Testanlagen GmbH. It should be noted that the direction of elongational deformation of the sample used for the measurement was set to coincide with the tire circumferential direction at the center of the sample.

Initial strain: 5%

Amplitude: ±10%

Frequency: 10 Hz

Deformation Mode: Tensile

Measurement temperature: 70° C.

In addition, the sum of the complex elastic modulus E* (MPa) of the sidewall rubber 3G and the stress (N) at 1% elongation of the conductive thread 9 is preferably 20 or less, more preferably 15 or less, further preferably 10 or less, and particularly preferably 5 or less. By setting the sum within this range, the generation of excessive stress in the sidewall portions 3 can be prevented, breakage of the conductive thread 9 can be easily suppressed, and moderate deflection can be ensured, therefore, it is considered that the ride comfort performance can be easily improved. On the other hand, the lower limit is not particularly limited, but is preferably 2 or more, more preferably 3 or more.

The sidewall rubber described above can be obtained by a known method, and the manufacturing method thereof is not particularly limited in the present disclosure. The sidewall rubber of the present embodiment can be obtained by adding fillers such as carbon black, silica, and the like, plasticizers such as oils, resins, liquid rubber, and so forth, and various additives such as stearic acid, zinc oxide, waxes, anti-aging agents, sulfur, vulcanization accelerators, and so on to a base rubber material containing isoprene-based rubber such as natural rubber (NR) and the like and butadiene rubber (BR), for example.

It is preferred that the sidewall rubber described above contains an isoprene-based rubber and a butadiene rubber from the viewpoint of forming a micro layer separation structure inside the rubber to facilitate absorption of external impact. Although the amount of isoprene-based rubber blended is not particularly limited, it is preferably 25% by mass or more and 70% by mass or less, more preferably 30% by mass or more and 60% by mass or less, and further preferably 35% by mass or more and 50% by mass or less in 100 parts by mass of the rubber component. Further, the blending amount of butadiene rubber in 100 parts by mass of the rubber component is preferably 30% by mass or more and 80% by mass or less, more preferably 40% by mass or more and 75% by mass or less, and further preferably 50% by mass or more and 70% by mass or less.

It should be noted that the complex elastic modulus of the sidewall rubber described above can be adjusted with the various additives and so on described above. Specifically, the complex modulus can be lowered by reducing the amount of fillers such as carbon black and silica, by increasing the amount of plasticizer components such as oil, and by reducing the amount of vulcanizing agents such as sulfur and vulcanization accelerators. It should be noted that, from the point of view of obtaining the above-mentioned complex elastic modulus, the sidewall rubber preferably contains 10 parts by mass or more and 80 parts by mass or less, and more preferably 30 parts by mass or more and 50 parts by mass or less, even more preferably 35 parts by mass or more and 45 parts by mass or less of the fillers with respect to 100 parts by mass of the rubber component. Further, from the viewpoint of making it easier to obtain the above-mentioned complex elastic modulus, the plasticizer is preferably 2 parts by mass or more and 25 parts by mass or less, more preferably 5 parts by mass or more and 22 parts by mass or less, and further preferably 10 parts by mass or more and 20 parts by mass or less.

Furthermore, in addition to the compounding agents described above, rubber components generally used in industry such as styrene-butadiene rubber and chloroprene rubber may be used as well as fillers such as clay, mica, aluminum hydroxide, resin components, and processing aids such as fatty acid metal salts as appropriate.

From the point of view of suppressing breakage of the conductive thread 9, a thickness of the sidewall rubber 3G is from 1.0 to 3.0 mm, and preferably from 1.5 to 2.0 mm, for example. This suppresses breakage of the conductive thread 9 and improves the ride comfort. It should be noted that the above-mentioned thickness is the thickness from the outer surface of the topping rubber of the carcass to the outer surface of one of the sidewall portions 3.

Note that the thickness of the sidewall rubber 3G mentioned above refers to the thickness in the direction perpendicular to the sidewall rubber surface at the maximum cross-sectional width position of the tire, and is the thickness excluding unevenness due to letters and the like. Simplified measurement can be made in a radial cross section of the tire with a width of the bead portion fixed to a width of the standard rim.

While detailed description has been made of the pneumatic tire according to embodiments of the present disclosure, the present disclosure can be embodied in various forms without being limited to the illustrated embodiments.

Examples

Pneumatic tires for passenger cars of size 195/70R15 having the basic structure shown in FIG. 1 were made by way of test according to the specifications listed in Tables 1 and 2. As References 1 and 2, pneumatic tires provided with the conductive threads having the stress at 1% elongation larger than 13 N were made by way of test. Each of the test tires had substantially the same configuration except for the conductive threads. It should be noted that the electrical resistance of each of the test tires is substantially the same and approximately $3.5 \times 10^5$ ($\Omega$) (hereinafter referred to as "electrical resistance when new"). As a result, each of the test tires has sufficient electrical conductivity to suppress radio interference such as radio noise.

The complex elastic modulus of the sidewall rubber in Tables 1 and 2 was measured by using smooth rubber strip samples taken from inside the sidewall. Each of the rubber strip samples was 40 mm long along the tire circumferential direction, 4 mm wide, and 1 mm thick. Further, the conductive threads were also taken from the test tires and various parameters were measured.

Each of the test tires was tested for a tire conductivity retention rate and the ride comfort. The test methods were as follows.

<Tire Conductivity After Use>

For each of the test tires, the electrical resistance of the tire after the tire were used under the same conditions (hereinafter referred to as "electrical resistance after use") was measured, and then the difference between the electrical resistance after use and the electrical resistance when new (increase amount in the resistance) was calculated. The results are indicated by an index based on the reciprocal of the aforementioned difference in Reference 1 being 100, wherein the larger the value, the better, indicating that the conductivity was maintained in a state close to that of a new product.

Figure 6:
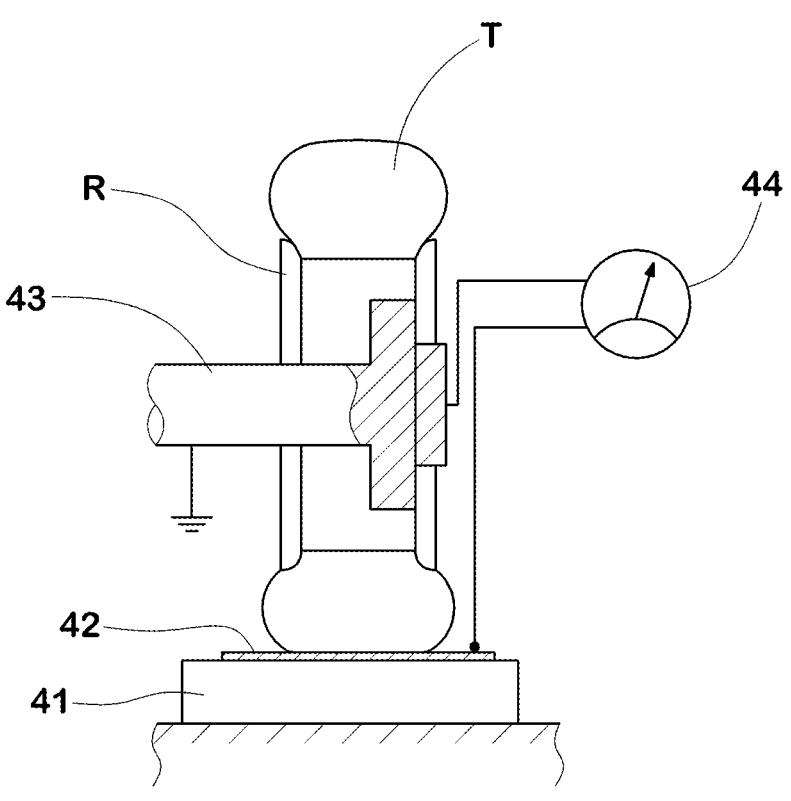
FIG. 6 is a schematic cross-sectional view conceptually showing a measuring device of electrical resistance of tires.

The electrical resistance of the tire in the above test method was measured as follows. As shown in FIG. 6, a measuring device including a metal plate 42 with a polished surface (with an electrical resistance of 10$\Omega$ or less) placed on an insulating plate 41 (with an electrical resistance of $10^{12}\Omega$ or more), a conductive tire mounting shaft 43 for holding a tire/rim assembly, and an electrical resistance measuring instrument 44 was used to measure the electrical resistance of the assembly of the test tire (T) and the rim (R) in accordance with JATMA regulations. It should be noted that each of the test tires (T) was used in a state in which the mold release agent and dirt had been sufficiently removed from the surface and the tire was sufficiently dry in advance. Other conditions were as follows.

Rim material: aluminum alloy

Rim size: 15×6.0 J

Tire inner pressure: 230 kPa

Tire load: 4.8 kN

Test environment temperature (test room temperature): 24° C.

Humidity: 24%

Measurement range of electrical resistance measuring instrument: from $1.0 \times 10^3$ to $1.6 \times 10^{16}\Omega$ Test voltage (applied voltage): 1000 V The procedure of the test was as follows.

(1) Mount the test tire (T) on the rim to prepare the tire/rim assembly. At this time, soapy water was used as a lubricant for the contact portion between the two.

(2) Allow the tire/rim assembly to stand in the test room for 2 hours before mounting it on the tire mounting shaft 43.

(3) Apply the above tire load to the tire/rim assembly for 0.5 minutes and then release, followed by another 0.5 minutes of the tire load application and then release, and followed by another 2 minutes of the tire load application.

(4) 5 minutes after the test voltage was applied, the electrical resistance between the tire mounting shaft 43 and the metal plate 42 was measured by the electrical resistance measuring instrument 44. The above measurement was performed at 16 locations equally spaced in the tire circumferential direction, and the average value of these measurements was taken as the electrical resistance value (measured value) of the concerned tire (T).

Further, the above-mentioned electrical resistance after use was the electrical resistance measured by the method described above after a test vehicle (displacement of 1600 cc, front-wheel drive) with the test tires mounted thereon was driven at a predetermined speed to run over a curb a predetermined number of times.

<Ride Comfort>

The ride comfort when driving a vehicle with the test tires mounted thereon was evaluated by the driver's sensory perception. Specifically, 20 drivers evaluated the ride comfort on a 5-point scale from 1 to 5, and the total score was calculated. The results are indicated by an evaluation point based on the total score of Reference 1 being 100, wherein the larger the numerical value, the better the ride comfort.

The test results are shown in Tables 1 and 2.

12

TABLE 3-continued

|  | A | B | C | D | E |
|---|---|---|---|---|---|
| Anti-Aging Agent 6C | 4.5 | 4.5 | 4.5 | 4.5 | 4.5 |
| Anti-Aging Agent RD | 2 | 2 | 2 | 2 | 2 |
| Sulfur | 2.2 | 1.9 | 1.6 | 1.3 | 1.3 |
| Vulcanization Accelerator NS | 0.9 | 1.2 | 0.9 | 0.9 | 0.9 |
| Complex Elastic Modulus [MPa] | 8.0 | 6.7 | 4.0 | 3.2 | 2.7 |

(unit: part by weight except where indicated)

As shown in Tables 1 and 2, it was confirmed that the tires in Examples maintained the conductivity even after the tires were subjected to a large local deformation. It was also confirmed that the tires in the Examples had excellent ride comfort.

It should be noted that the sum of the value of the tire conductivity after use and the evaluation point of the ride comfort may be used as an indicator of overall performance

TABLE 1

|  |  | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|---|
| Diameter of Composite Thread | [mm] | 1.00 | 0.70 | 0.10 | 0.10 | 0.15 | 0.15 | 0.40 | 0.05 | 0.45 |
| Ratio by weight of Non-Conductive Fiber | [%] | 80 | 80 | 80 | 70 | 80 | 70 | 80 | 80 | 90 |
| Ratio by weight of Conductive Fiber | [%] | 20 | 20 | 20 | 30 | 20 | 30 | 20 | 20 | 10 |
| Stress at 1% Elongation | [N] | 23.3 | 14.3 | 0.09 | 0.08 | 0.14 | 0.13 | 0.36 | 0.05 | 1.82 |
| Stress at 2% Elongation | [N] | 40.0 | 24.7 | 0.61 | 0.55 | 0.92 | 0.83 | 0.92 | 0.31 | 3.10 |
| Breaking Strength | [N] | 188.0 | 108.0 | 11.3 | 10.2 | 17.0 | 15.3 | 45.2 | 5.7 | 10.1 |
| Elongation at Break | [%] | 26.7 | 28.5 | 12.3 | 11.1 | 18.5 | 16.7 | 49.2 | 6.2 | 33.1 |
| Complex Elastic Modulus of Sidewall Rubber | [MPa] | 8.0 | 8.0 | 8.0 | 8.0 | 8.0 | 8.0 | 8.0 | 8.0 | 8.0 |
| Sidewall Rubber Formulation |  | A | A | A | A | A | A | A | A | A |
| Thickness of Sidewall Rubber | [mm] | 3.0 | 3.0 | 3.0 | 3.0 | 3.0 | 3.0 | 3.0 | 3.0 | 3.0 |
| Tire Conductivity After Use | [index] | 100 | 106 | 140 | 154 | 147 | 162 | 180 | 135 | 130 |
| Ride Comfort | [evaluation point] | 100 | 106 | 116 | 116 | 114 | 114 | 108 | 118 | 116 |

TABLE 2

|  |  | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|
| Diameter of Composite Thread | [mm] | 0.50 | 0.60 | 0.10 | 0.10 | 0.10 | 0.10 | 0.10 | 0.10 | 0.10 | 0.10 |
| Ratio by weight of Non-Conductive Fiber | [%] | 80 | 80 | 80 | 80 | 80 | 80 | 80 | 80 | 80 | 80 |
| Ratio by weight of Conductive Fiber | [%] | 20 | 20 | 20 | 20 | 20 | 20 | 20 | 20 | 20 | 20 |
| Stress at 1% Elongation | [N] | 5.43 | 11.53 | 0.09 | 0.09 | 0.09 | 0.09 | 0.09 | 0.09 | 0.09 | 0.09 |
| Stress at 2% Elongation | [N] | 8.54 | 15.63 | 0.61 | 0.61 | 0.61 | 0.61 | 0.61 | 0.61 | 0.61 | 0.61 |
| Breaking Strength | [N] | 31.4 | 68.4 | 11.3 | 11.3 | 11.3 | 11.3 | 11.3 | 11.3 | 11.3 | 11.3 |
| Elongation at Break | [%] | 32.3 | 30.1 | 12.3 | 12.3 | 12.3 | 12.3 | 12.3 | 12.3 | 12.3 | 12.3 |
| Complex Elastic Modulus of Sidewall Rubber | [MPa] | 8.0 | 8.0 | 6.7 | 4.0 | 3.2 | 2.7 | 8.0 | 8.0 | 8.0 | 8.0 |
| Sidewall Rubber Formulation |  | A | A | B | C | D | E | A | A | A | A |
| Thickness of Sidewall Rubber | [mm] | 3.0 | 3.0 | 3.0 | 3.0 | 3.0 | 3.0 | 1.0 | 1.5 | 2.0 | 4.0 |
| Tire Conductivity After Use | [index] | 126 | 120 | 140 | 140 | 140 | 128 | 140 | 140 | 140 | 140 |
| Ride Comfort | [evaluation point] | 110 | 108 | 118 | 120 | 126 | 126 | 130 | 126 | 120 | 110 |

It should be noted that sidewall rubber formulations A to E listed in Tables 1 and 2 are as shown in Table 3 below.

TABLE 3

|  | A | B | C | D | E |
|---|---|---|---|---|---|
| TSR20 | 40 | 40 | 40 | 40 | 40 |
| BR150B | 60 | 60 | 60 | 60 | 60 |
| Carbon (N550) | 75 | 65 | 45 | 40 | 40 |
| Oil | 10 | 15 | 15 | 15 | 25 |
| Stearic Acid | 3 | 3 | 3 | 3 | 3 |
| Zinc Oxide | 4.5 | 4.5 | 4.5 | 4.5 | 4.5 |
| Wax | 2 | 2 | 2 | 2 | 2 | of the Examples shown in Tables 1 and 2. As shown in Tables 1 and 2, it was confirmed that the tires in the Examples were excellent in the overall performance including the conductivity and the ride comfort.

Statement of Disclosure

The present disclosure includes the following aspects.

Present Disclosure 1

A pneumatic tire including a carcass, wherein the carcass includes a carcass ply extending from one bead portion to the other bead portion through a tread portion, the carcass ply is provided with at least one conductive thread extending from the one bead portion to at least the tread portion, the conductive thread has an electrical resistance of $10^8$ $\Omega$/cm or less per unit length, and the conductive thread has a stress of 13 N or less at 1% elongation.

Present Disclosure 2

The pneumatic tire according to Present Disclosure 1, wherein the conductive thread has a stress of 25 N or less at 2% elongation.

Present Disclosure 3

The pneumatic tire according to Present Disclosure 1 or 2, wherein the conductive thread is arranged on an outer surface of the carcass ply.

Present Disclosure 4

The pneumatic tire according to any one of Present Disclosures 1 to 3, wherein the conductive thread includes a metal filament or a carbon fiber.

Present Disclosure 5

The pneumatic tire according to Present Disclosure 4, wherein the metal filament includes stainless steel.

Present Disclosure 6

The pneumatic tire according to any one of Present Disclosures 1 to 5, wherein the conductive thread is a composite thread containing a conductive fiber and a non-conductive fiber.

Present Disclosure 7

The pneumatic tire according to Present Disclosure 6, wherein the non-conductive fiber includes polyester or polyamide.

Present Disclosure 8

The pneumatic tire according to Present Disclosure 6 or 7, wherein the composite thread contains the non-conductive fiber of 50% or more by weight.

Present Disclosure 9

The pneumatic tire according to any one of Present Disclosures 1 to 8, wherein a diameter of the conductive thread is from 0.03 to 1.00 mm.

Present Disclosure 10

The pneumatic tire according to any one of Present Disclosures 1 to 9, wherein an elongation at break of the conductive thread is from 5% to 20%.

Present Disclosure 11

The pneumatic tire according to any one of Present Disclosures 1 to 10 further including a sidewall portion, of which outer surface is formed by a sidewall rubber, arranged between the tread portion and the bead portion, wherein a complex elastic modulus of the sidewall rubber is from 3.2 to 8.0 MPa.

Present Disclosure 12

The pneumatic tire according to any one of Present Disclosures 1 to 11 further including a sidewall portion, of which outer surface is formed by a sidewall rubber, arranged between the tread portion and the bead portion, wherein a sum of a complex elastic modulus (MPa) of the sidewall rubber and a stress (N) at 1% elongation of the conductive thread is 20 or less.

Present Disclosure 13

The pneumatic tire according to any one of Present Disclosures 1 to 12, wherein the carcass ply includes multiple carcass cords arranged in parallel, and the stress at 1% elongation of the conductive thread is smaller than a stress at 1% elongation of the carcass cords.

Present Disclosure 14

The pneumatic tire according to any one of Present Disclosures 1 to 13, wherein the conductive thread extends in a wavy manner.

Present Disclosure 15

The pneumatic tire according to Present Disclosure 14, wherein an amplitude of the conductive thread in the tread portion is larger than an amplitude of the conductive thread in the bead portions.

The invention claimed is:

1. A pneumatic tire comprising:

a tread portion;

a pair of bead portions; and a carcass, wherein the carcass includes a carcass ply extending from one of the bead portions to the other one of the bead portions through the tread portion, the carcass ply is provided with one or more conductive threads extending from the one of the bead portions to at least the tread portion, each of the one or more conductive threads has an electrical resistance of $10^8$ $\Omega$/cm or less per unit length, each of the one or more conductive threads has a stress of 13 N or less at 1% elongation, each of the one or more conductive threads is a composite thread containing one or more conductive fibers each composed of lower-twisted filaments and one or more non-conductive fibers each composed of lower-twisted filaments, the composite thread is formed by upper-twisting the one or more conductive fibers and the one or more non-conductive fibers, and each of the one or more conductive threads extends in a wavy manner with a peak-to-peak amplitude from 0.5 to 1.5 mm and a wavelength from 30 to 80 mm.

2. The pneumatic tire according to claim 1, wherein each of the one or more conductive threads has a stress of 25 N or less at 2% elongation.

3. The pneumatic tire according to claim 1, wherein each of the one or more conductive threads is arranged on an outer surface of the carcass ply.

4. The pneumatic tire according to claim 1, wherein each of the one or more conductive threads includes a metal filament or a carbon fiber.

5. The pneumatic tire according to claim 4, wherein the metal filament includes stainless steel.

6. The pneumatic tire according to claim 1, wherein the one or more non-conductive fibers include polyester or polyamide.

7. The pneumatic tire according to claim 1, wherein the composite thread contains the one or more non-conductive fibers of 50% or more by weight.

8. The pneumatic tire according to claim 1, wherein a diameter of the conductive thread is from 0.03 to 1.00 mm.

9. The pneumatic tire according to claim 1, wherein an elongation at break of each of the one or more conductive threads is from 5% to 20%.

10. The pneumatic tire according to claim 1, further comprising sidewall portions, each arranged between the tread portion and a respective one of the bead portions, wherein each sidewall portion includes a sidewall rubber forming an outer surface of the each sidewall portion, and a complex elastic modulus of the sidewall rubber is from 3.2 to 8.0 MPa.

11. The pneumatic tire according to claim 1, further comprising sidewall portions, each arranged between the tread portion and a respective one of the bead portions, wherein each sidewall portion includes a sidewall rubber forming an outer surface of the each sidewall portion, and a sum of a complex elastic modulus (MPa) of the sidewall rubber and a stress (N) at 1% elongation of each of the one or more conductive threads is 20 or less.

12. The pneumatic tire according to claim 1, wherein the carcass ply includes multiple carcass cords arranged in parallel, and the stress at 1% elongation of each of the one or more conductive threads is smaller than a stress at 1% elongation of the carcass cords.

13. The pneumatic tire according to claim 1, wherein an amplitude of each of the one or more conductive threads in the tread portion is larger than an amplitude of the conductive thread in the bead portions.

14. The pneumatic tire according to claim 1, wherein a maximum stress at break of the or each conductive thread is from 5 to 50 N.

15. The pneumatic tire according to claim 1, wherein the one or more conductive fibers are formed by twisting metal filaments made of stainless steel, and the stainless steel is ferritic stainless steel or austenitic stainless steel.

16. The pneumatic tire according to claim 1, wherein the one or more conductive fibers have an electrical resistance per unit length of $10^5$ Ω/cm or less, and the one or more non-conductive fibers have an electrical resistance per unit length of $10^8$ Ω/cm or more.

17. A pneumatic tire comprising:

a tread portion;

a pair of bead portions; and a carcass, wherein the carcass includes a carcass ply extending from one of the bead portions to the other one of the bead portions through the tread portion, the carcass ply is provided with one or more conductive threads extending from the one of the bead portions to at least the tread portion, each of the one or more conductive threads has an electrical resistance of $10^8$ Ω/cm or less per unit length and a stress of 13 N or less at 1% elongation, each of the one or more conductive threads extends in a wavy manner with a first amplitude while a center of the first amplitude forming a wave shape with a second amplitude in a tire circumferential direction larger than the first amplitude, the first amplitude is 2.0 mm or less, and the second amplitude is from 50 to 150 mm.

* * * * *